(12) United States Patent
Lou et al.

(10) Patent No.: US 10,759,819 B2
(45) Date of Patent: Sep. 1, 2020

(54) SINGLE-SIDE MODIFIED β-ANDERSON-TYPE HETEROPOLYMOLYBDATE ORGANIC DERIVATIVES

(71) Applicant: PETROCHINA COMPANY LIMITED, Beijing (CN)

(72) Inventors: Jianhui Lou, Beijing (CN); Yongge Wei, Beijing (CN); Bin Ding, Beijing (CN); Jiangwei Zhang, Beijing (CN); Pingmei Wang, Beijing (CN); Jin Zhang, Beijing (CN); Xiangfei Geng, Beijing (CN); Zheyu Wei, Beijing (CN); Baoliang Peng, Beijing (CN); Lipeng He, Beijing (CN)

(73) Assignee: PETROCHINA COMPANY LIMITED, Beijing (CN)

( * ) Notice: Subject to any disclaimer, the term of this patent is extended or adjusted under 35 U.S.C. 154(b) by 26 days.

(21) Appl. No.: 16/412,768

(22) Filed: May 15, 2019

(65) Prior Publication Data
US 2019/0352320 A1 Nov. 21, 2019

(30) Foreign Application Priority Data
May 15, 2018 (CN) .......................... 2018 1 0461247

(51) Int. Cl.
*C07F 11/00* (2006.01)
(52) U.S. Cl.
CPC .................................. *C07F 11/005* (2013.01)

(58) Field of Classification Search
None
See application file for complete search history.

(56) References Cited

PUBLICATIONS

Xu et al., Chem. Connnnun., 2017, 53, 5283. (Year: 2017).*
Zhang et al., "β-{Cr[RC(CH2O)3]2Mo6O18}3-: the first organically-functionalized β isomer of Anderson-type polyoxometalates," Inorganic Chemistry Frontiers, Partner Organisations 2017, No. 4, pp. 1215-1218.
Zhang et al., "A Controllable Synthetic Strategy to Asymmetric Organic-Inorganic Hybrids via Stepwise Modification of Parent Anderson Polyoxometalates," Department of Chemistry, Tsinghua University.
Zhang et al., "Controllable Alkoxylation of Anderson-type Heteropolyoxometalates and their Catalytic Properties," Tsinghua University, Mar. 2016, 36 pages.

* cited by examiner

*Primary Examiner* — Clinton A Brooks
*Assistant Examiner* — Kofi Adzamli
(74) *Attorney, Agent, or Firm* — Hoffman Warnick LLC

(57) ABSTRACT

The present disclosure provides a single-side modified β-Anderson-type heteropolymolybdate organic derivative having an anionic moiety with a general formula represented by: $\beta\text{-}\{[RC(CH_2O)_3]M(OH)_3Mo_6O_{18}\}^{3-}$; β represents a non-planar folded structure; R=substituted or unsubstituted phenyl, $C_nH_{2n}X$ (n is an integer from 0 to 22; X=H, OH, $NH(CH_2)_3SO_3H$, $NHCH_2COOH$, $NH_2$, or $NO_2$); $M=Cr^{3+}$. The single-side modified β-Anderson-type heteropolymolybdate organic derivative can be prepared under hydrothermal conditions.

3 Claims, 4 Drawing Sheets

[Fig. 1]
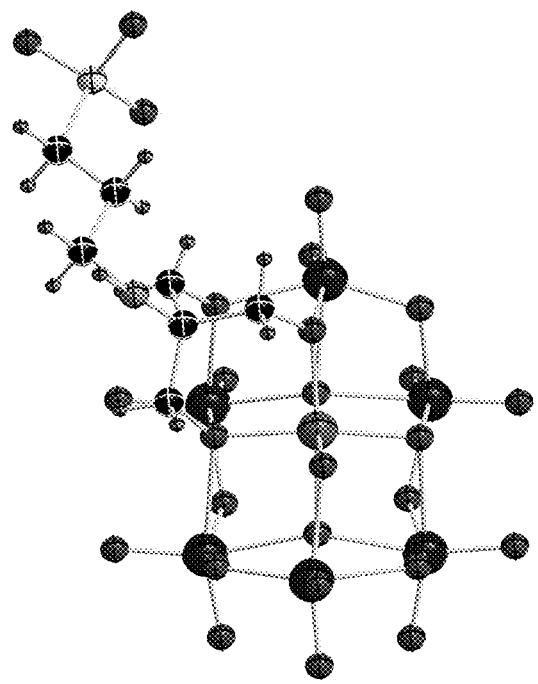
[Fig. 2]
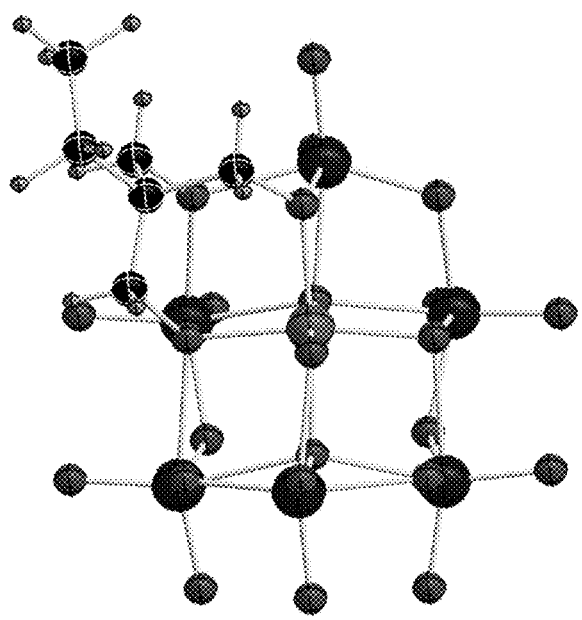

[Fig. 3]
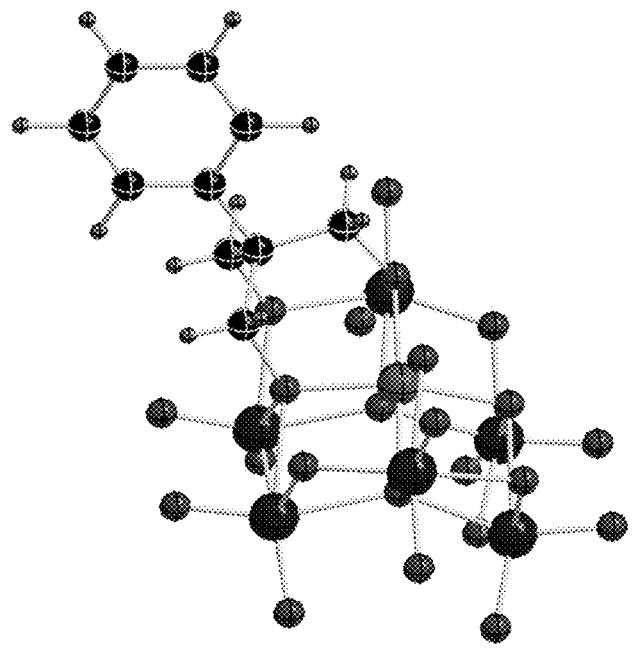
[Fig. 4]
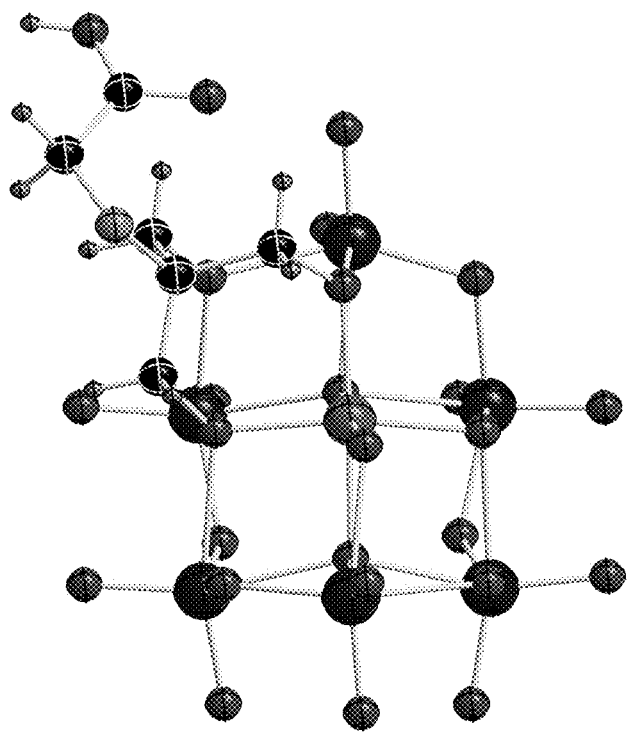

[Fig. 5]
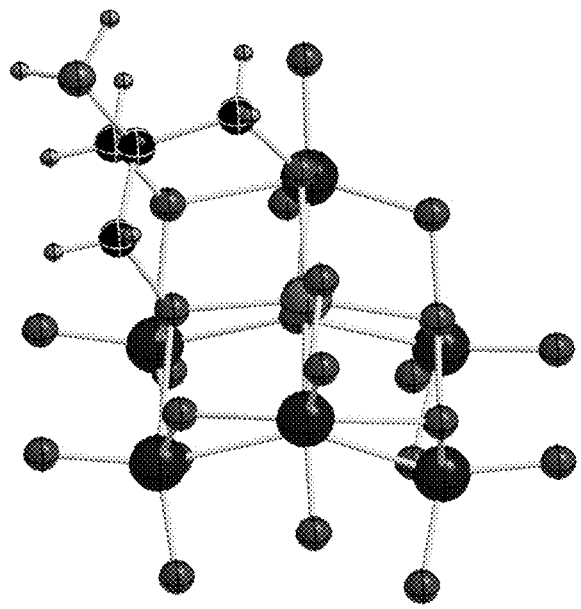
[Fig. 6]
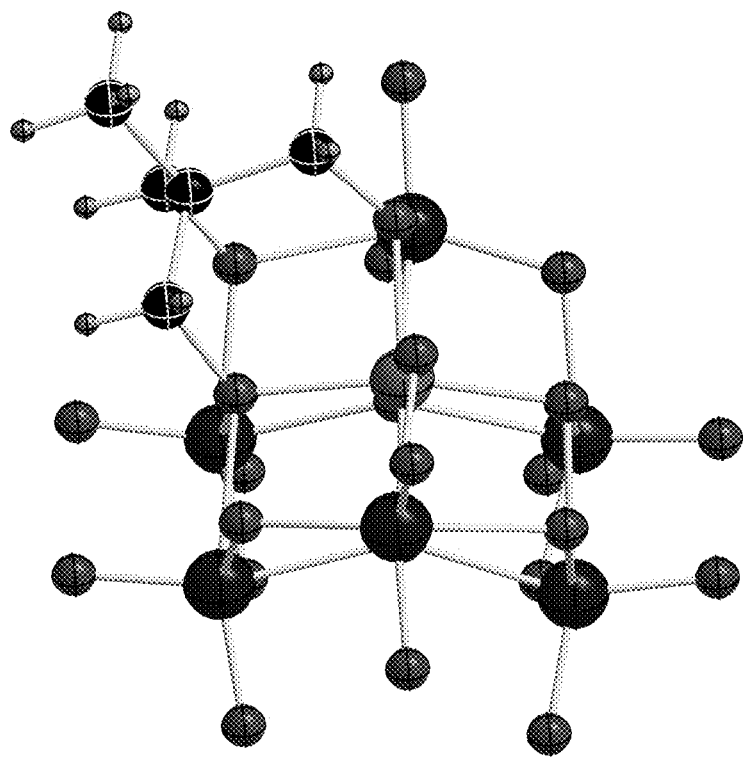

[Fig. 7]
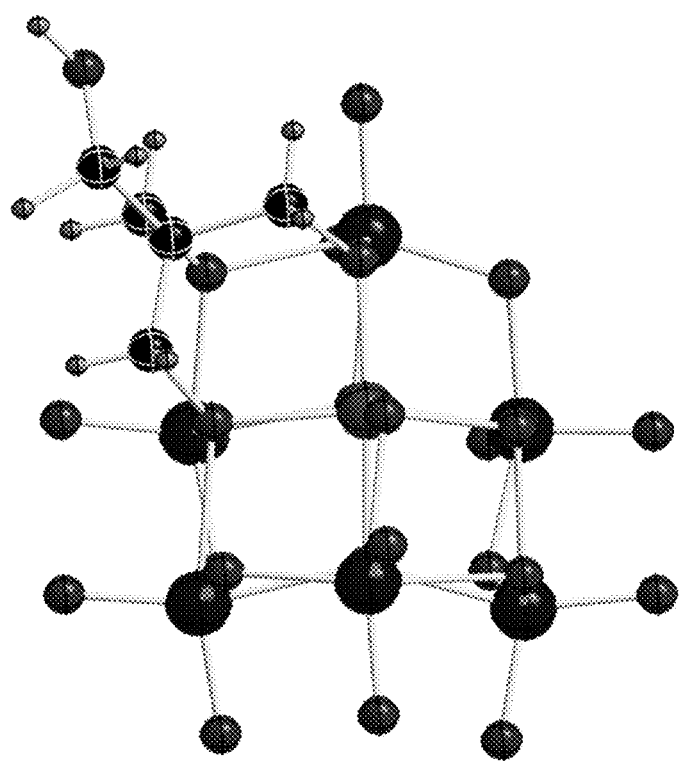
[Fig. 8]
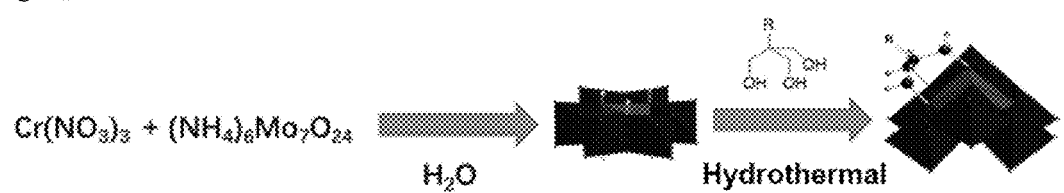

a single-side modified β-Anderson-type heteropolymolybdate organic derivative comprising an anionic moiety and a cationic moiety, wherein the anionic moiety has a general formula represented by: $\beta\text{-}\{[RC(CH_2O)_3]M(OH)_3Mo_6O_{18}\}^{3-}$; β represents a non-planar folded structure; $R=C_nH_{2n}X$ (n is an integer from 0 to 22; X=H, OH, $NH(CH_2)_3SO_3H$, $NHCH_2COOH$, $NH_2$, or $NO_2$); $M=Cr^{3+}$.

SINGLE-SIDE MODIFIED β-ANDERSON-TYPE HETEROPOLYMOLYBDATE ORGANIC DERIVATIVES

CROSS-REFERENCE TO RELATED APPLICATIONS

This application claims priority to Chinese Patent Application No. 2018104612471, filed 15 May 2018, which is hereby incorporated herein as though fully set forth.

FIELD OF THE INVENTION

The present specification relates to a single-side modified β-Anderson-type heteropolymolybdate organic derivative.

BACKGROUND

Polymetallic oxygen cluster compounds, also known as polyoxometalates (POMs), are a large class of "molecular state" inorganic nanocluster compounds with a spatial network structure formed by highly polymerized transition metal ions of high valence (e.g., Mo(VI), W(VI), V(V), Nb(V), Ta(V) and the like) with oxygen anions. Although Anderson-type hetero-polyoxometalates are one of the early-found basic polyoxometalate structures, most of them are synthesized under weaker acidic (near-neutral) conditions and have poor stability, and thus few studies were conducted on Anderson-type polyoxometalates and derivatives thereof. Early work mainly focused on simple investigation of the isolated anionic clusters thereof. As an important branch of polyoxometalate organic modification chemistry, alkoxylating modification of polyoxometalates has regained the attention of chemists in recent years. Among them, trimethylol-based organic ligands, $RC(CH_2OH)_3$ ($R=NH_2$, Me, Et, $NO_2$ and the like, simply referred to as tris), is widely used in the organic modification of polyoxometalates including Lindqvist-, Dawson-, and Anderson-type polyoxometalates.

The classical Anderson-type heteropolymolybdate alkoxylated derivatives with Mn(III) as the center heteroatom is mainly obtained by reconstructing and assembling octamolybdate in an acetonitrile organic phase followed by further reaction with a tripod alkoxide organic ligand, and is primarily used for the preparation of symmetric double-side modified Anderson-type heteropolymolybdate alkoxylated derivatives. Single-side modified α-Anderson-type heteropolymolybdate alkoxylated organic derivatives (with a planar configuration) is currently known to be possibly prepared in an aqueous phase. However, a non-planar configuration with a single-side modification has not yet been revealed.

SUMMARY OF THE INVENTION

In view of the above problems, it is an object of the present specification to provide a single-side modified β-Anderson-type heteropolymolybdate organic derivative.

A further object of the present specification is to provide a method for preparing a single-side modified β-Anderson-type heteropolymolybdate organic derivative.

Another object of the present specification is to provide a single-side modified β-Anderson-type heteropolymolybdate organic derivative prepared by the above method.

To achieve the above objects, the present specification provides a single-side modified β-Anderson-type heteropolymolybdate organic derivative comprising an anionic moiety and a cationic moiety, wherein the anionic moiety has a general formula represented by: $\beta\text{-}\{[RC(CH_2O)_3]M(OH)_3Mo_6O_{18}\}^{3-}$; β represents a non-planar folded structure; $R=C_nH_{2n}X$ (n is an integer from 0 to 22; X=H, OH, $NH(CH_2)_3SO_3H$, $NHCH_2COOH$, $NH_2$, or $NO_2$); $M=Cr^{3+}$.

The single-side modified β-Anderson-type heteropolymolybdate organic derivative having a trivalent metal as the center heteroatom is an Anderson-type heteropolymolybdate organic derivative which, unlike those having the conventional planar configuration (the α-type), has a non-planar folded structure. Whether such a folded type substance actually exists has always been a problem that puzzled the researchers in the related field. The major reason lies in that the Anderson-type heteropolymolybdate of the folded type is not as stable as the isomer having the corresponding planar configuration. On one hand, the single-side modified non-planar structure has low symmetry, and it is unknown as to what non-planar structure does exist. On the other hand, although the skilled person has developed a scheme to prepare a single-side modified α-Anderson-type heteropolymolybdate organic derivative in an aqueous phase (using α-Anderson-type hetero-polyoxometalate salt and a trimethylol alkoxy organic ligand as starting materials), it is still not possible to prepare a single-side modified β-Anderson-type heteropolymolybdate organic derivative with a solution similar to that used for preparing a single-side modified α-Anderson-type heteropolymolybdate organic derivative, because no β-Anderson-type heteropolymolybdate having a trivalent metal as center heteroatom has been found yet. At present, by using an α-Anderson-type heteropolymolybdate as starting material, it is only our research group that has obtained a small number of β-Anderson-type heteropolymolybdate organic derivatives in organic solvents, which are also symmetric double-side modified derivatives. Our research shows that in the organic solvent approach, even if the amount of the starting material is purposely controlled, only double-side modified β-Anderson-type heteropolymolybdate organic derivatives can be obtained. Therefore, the applicant of the present invention has for the first time revealed a single-side modified Anderson-type heteropolymolybdate organic derivative with a non-planar structure, which is of great significance both in theoretical research and in practical applications.

The single-side modified β-Anderson-type heteropolymolybdate organic derivative provided by the present specification is an organic salt composed of an anionic moiety and a cationic moiety. The anionic moiety has a general formula represented by: $\beta\text{-}\{[RC(CH_2O)_3]M(OH)_3Mo_6O_{18}\}^{3-}$; wherein, "β" represents a non-planar folded configuration, which is a low-symmetry isomer of an Anderson-type heteropolymolybdate having the conventional planar structure (a type), and its structure can be determined by single crystal X-ray diffraction. "$M(OH)_3Mo_6O_{18}$" is a moiety of an Anderson-type heteropolymolybdic acid basis, and "$RC(CH_2O)_3$" is a trimethylol-type organic ligand used for the modification of the basis. The center heteroatom of the Anderson-type heteropolymolybdic acid moiety may be Cr. R in the trimethylol organic ligand may be a substituted or unsubstituted phenyl group $C_nH_{2n}X$ (n is an integer from 0 to 22; X=H, OH, NH$(CH_2)_3SO_3H$, $NHCH_2COOH$, $NH_2$ or $NO_2$). The cation paired with the above-mentioned anionic moiety comprises one or more of $TBA^+$, $TEA^+$, $TMA^+$, $NH_4^+$, or $H_3NC$ $(CH_2O)_3^+$. The anionic moiety is negatively charged and trivalent, and the cationic moiety necessarily has a matching total charge.

The single-side modified β-Anderson-type heteropolymolybdate organic derivative provided by the present specification includes:

$(NH_4)_3 \cdot \beta\text{-}\{[O_3S(CH_2)_3NH_2C(CH_2O)_3]CrMo_6O_{18}(OH)_3\}$; (1)

$(NH_4)_3 \cdot \beta\text{-}\{[C_2H_5C(CH_2O)_3]CrMo_6O_8(OH)_3\}$; (2)

$(NR_4)_3 \cdot \beta\text{-}\{[C_6H_5C(CH_2O)_3]CrMo_6O_{18}(OH)_3\}$; (3)

$(NH_4)_3 \cdot \beta\text{-}\{[HOOCCH_2NHC(CH_2O)_3]CrMo_6O_{18}(OH)_3\}$; (4)

$[H_3NC(CH_2O)_3]_2 \cdot \beta\text{-}\{[H_3NC(CH_2O)_3]CrMo_6O_{18}(OH)_3\}$; (5)

$[TBA]_4 \cdot \beta\text{-}\{[H_2NC(CH_2O)_3]CrMo_6O_{18}(OH)_3\}Br$; (6)

$[TBA]_3 \cdot \beta\text{-}\{[CH_3C(CH_2O)_3]CrMo_6O_{18}(OH)_3\}$; (7)

$(NH_4)[TBA]_4 \cdot \beta\text{-}\{[C_2H_5C(CH_2O)_3]CrMo_6O_{18}(OH)_3\}Br_2$; (8)

$[TEA][TBA]_3 \cdot \beta\text{-}\{[HOCH_2C(CH_2O)_3]CrMo_6O_{18}(OH)_3\}Cl$; (9)

$[TMA]_2 \cdot \beta\text{-}\{[H_3NC(CH_2O)_3]CrMo_6O_{18}(OH)_3\}$. (10).

The present specification also provides a method for preparing a single-side modified β-Anderson-type heteropolymolybdate organic derivative by conducting a first hydrothermal reaction between an α-Anderson-type heteropolymolybdate and a trimethylolmethane derivative to produce a single-side modified β-Anderson-type heteropolymolybdate organic derivative, wherein the reaction temperature of the first hydrothermal reaction is 10 to 40° C. higher than that of a second hydrothermal reaction for preparing the corresponding single-side modified α-Anderson-type heteropolymolybdate organic derivative.

In our study on the preparation of a single-side modified α-Anderson-type heteropolymolybdate organic derivative in an aqueous phase, hydrothermal synthesis conditions was tested with a reaction temperature accidentally set at more than 10° C. above the temperature of a conventional hydrothermal reaction, and a material having a non-planar configuration (and basically a single product) was unexpectedly obtained. That is to say, this is not a matter of the yield of the desired product, but rather provides a method for preparing a material of a completely new configuration. A series of tests show that the material is a single-side modified β-Anderson-type heteropolymolybdate organic derivative with a folded non-planar structure (the structure can be determined by single crystal X-ray diffraction). Upon further investigation, it is speculated that when the tris ligand undergoes organic modification by alkoxylation at the $\mu_3$-OH reaction site on one side thereof in an aqueous phase, it may possibly be isomerized at the same time to a β isomer under hydrothermal conditions, thereby efficiently and directionally synthesizing an alkoxylated organic-inorganic hybrid derivative of a single-side modified β-Anderson-type heteropolymolybdate.

The α-Anderson-type heteropolymolybdate used may be a finished product used directly, or may be manually prepared. In an embodiment provided by the present invention, the preparation process is shown in FIG. 8.

In this process for preparing a single-side modified β-Anderson-type heteropolymolybdate organic derivative, the reaction temperature of the first hydrothermal reaction is preferably higher than that of the second hydrothermal reaction by 15 to 35° C. When the temperature is within this range, the product has not only high purity but a high yield as well, and therefore a highly pure finished product may be obtained by means of simple purification.

In the above method for preparing the single-side modified β-Anderson-type heteropolymolybdate organic derivative, the reaction temperature of the first hydrothermal reaction is preferably from 110 to 160° C.; preferably from 120 to 150° C.

In the above method for preparing the single-side modified β-Anderson-type heteropolymolybdate organic derivative, the reaction time of the first hydrothermal reaction is preferably from 6 to 30 hours; preferably from 8 to 24 hours.

In the above method for preparing the single-side modified β-Anderson-type heteropolymolybdate organic derivative, preferably, after the first hydrothermal reaction is completed, a process for post-treating the reaction solution comprises: allowing the reaction solution from the completion of the first hydrothermal reaction to naturally evaporate, and collecting the crystals precipitated, so as to obtain a single-side modified β-Anderson-type heteropolymolybdate organic derivative. Because it is the only product and has a high yield, a product with high purity, generally up to 90% or above, can be obtained by natural evaporation. Certainly, it can be further purified by other purification means if necessary.

In the above method for preparing the single-side modified β-Anderson-type heteropolymolybdate organic derivative, the α-Anderson-type heteropolymolybdate and the trimethylol methane derivative can be fed in a material ratio in accordance with that used in the conventional preparation of single-side modified α-Anderson-type heteropolymolybdate organic derivatives, while an appropriate ratio can be determined according to the raw materials selected specifically. Preferably, in the first hydrothermal reaction, the molar ratio of the α-Anderson-type heteropolymolybdate to the trimethylolmethane derivative is 1:1 to 2:3.

In the above method for preparing the single-side modified β-Anderson-type heteropolymolybdate organic derivative, the amount of water used can be determined according to the hydrothermal conditions in the conventional preparation of single-side modified α-Anderson-type heteropolymolybdate organic derivatives. Preferably, the amount of water used as solvent in the first hydrothermal reaction is 40 to 60 mL of water solvent per 1 mmol of the α-Anderson-type heteropolymolybdate.

In the above method for preparing the single-side modified β-Anderson-type heteropolymolybdate organic derivative, particular organic solvents such as acetonitrile or ethanol may be added to the water as solvent. These organic solvents can increase the solubility of the organic ligands.

In the above method for preparing the single-side modified β-Anderson-type heteropolymolybdate organic derivative, preferably, the cationic moiety of the α-Anderson-type heteropolymolybdate comprises one or more of $TBA^+$, $TEA^+$, $TMA^+$, $NH_4^+$, and $H_3NC(CH_2O)_3^+$.

In the above method for preparing the single-side modified β-Anderson-type heteropolymolybdate organic derivative, preferably, the trimethylolethane derivative has a general formula represented by: $RC(CH_2OH)_3$, R=substituted or unsubstituted phenyl, $C_nH_{2n}X$ (n is an integer from 0 to 22; X=H, OH, $NH(CH_2)_3SO_3H$, $NHCH_2COOH$, $NH_2$ or $NO_2$).

The present invention also provides a single-side modified β-Anderson-type heteropolymolybdate organic derivative prepared by the aforementioned method. A single-side modified β-Anderson-type heteropolymolybdate organic derivative, wherein the anionic moiety has a general formula represented by:

$$\beta\text{-}\{[RC(CH_2O)_3]M(OH)_3Mo_6O_{18}\}^{3-};$$

β represents a non-planar folded structure;

R=substituted or unsubstituted phenyl, $C_nH_{2n}X$ (n is an integer from 0 to 22; X=H, OH, $NH(CH_2)_3SO_3H$, $NHCH_2COOH$, $NH_2$ or $NO_2$);

$M=Cr^{3+}$.

The single-side modified β-Anderson-type heteropolymolybdate organic derivative provided in the present invention can be used to prepare a selective adsorbent or catalyst with excellent performance.

BRIEF DESCRIPTION OF THE DRAWINGS

FIG. 1 is a diagram showing the crystal structure of the anion of Example 1 of the present invention;

FIG. 2 is a diagram showing the anion crystal structure of Example 2 of the present invention;

FIG. 3 is a diagram showing the anion crystal structure of Example 3 of the present invention;

FIG. 4 is a diagram showing the anion crystal structure of Example 4 of the present invention;

FIG. 5 is a diagram showing the anion crystal structure of Example 6 of the present invention;

FIG. 6 is a diagram showing the anion crystal structure of Example 7 of the present invention;

FIG. 7 is a diagram showing the crystal structure of the anion of Example 9 of the present invention.

FIG. 8 is a diagram showing a reaction scheme according to one embodiment of the present invention.

DETAILED DESCRIPTION OF THE INVENTION

For better understanding of the technical features, objects, and advantages of the present invention, the technical solutions of the present specification are now described in details below, which is not to be construed as limitation to the scope of the invention.

Example 1

This example provides a single-side modified β-Anderson-type heteropolymolybdate organic derivative having the chemical formula: $(NH_4)_3 \cdot \beta\text{-}\{[O_3S(CH_2)_3NH_2C(CH_2O)_3]CrMo_6O_{18}(OH)_3\}$, which was prepared in the process as follows:

10.71 g (10 mmol) of Cr-Anderson-type heteropolymolybdate, $(NH_4)_3 \cdot \alpha\text{-}[CrMo_6O_{18}(OH)_6]$, and 2.673 g of $O_3S(CH_2)_3NH_2C(CH_2OH)_3$ (11 mmol) were mixed in 50 ml water, subjected to a hydrothermal reaction at 150° C. for 12 hours, and naturally evaporated in the air to obtain a pink crystal with a yield of 90%.

Crystallographic data: $C_7H_{45}N_4CrMo_6O_{35}S$, $M_r=1373.20$, triclinic, space group P-1, a=11.4862(3), b=14.5313(4), c=13.6421 (6) Å, α=84.163(3)° β=82.167(2)° γ=73.264(3)°, Z=2, T=100(2) K, $R_1$(final)=0.0312, $wR_2$=0.0743.

IR (KBr pellet, $cm^{-1}$): 3343, 1642, 1400, 1223, 1173, 1106, 1050, 935, 913, 895, 794, 659.

The anion crystal structure is shown in FIG. 1.

Example 2

This example provides a single-side modified β-Anderson-type heteropolymolybdate organic derivative having the chemical formula: $(NH_4)_3 \cdot \beta\text{-}\{[C_2H_5C(CH_2O)_3]CrMo_6O_{18}(OH)_3\}$, which was prepared in the process as follows:

10.71 g (10 mmol) of Cr-Anderson-type heteropolymolybdate, $(NH_4)_3 \cdot \alpha\text{-}[CrMo_6O_{18}(OH)_6]$, and 1.5 g of $C_2H_5C(CH_2OH)_3$ (10 mmol) were mixed in 50 ml water, subjected to a hydrothermal reaction at 110° C. for 8 hours, and naturally evaporated in the air to obtain a pink crystal with a yield of 95%.

Crystallographic data: $C_6H_{32}N_3CrMo_6O_{27}$, $M_r=1205.96$, monoclinic, space group $C_2/c$, a=22.8626(8), b=11.6855(3), c=25.7488(11) Å, α=γ=9013=113.490(4)°, Z=8, T=100(2) K, $R_1$(final)=0.0298, $wR_2$=0.0655.

IR(KBr pellet, $cm^{-1}$): 3459, 2962, 2874, 1650, 1404, 1117, 1055, 943, 911, 674, 566.

The anion crystal structure is shown in FIG. 2.

Example 3

This example provides a single-side modified β-Anderson-type heteropolymolybdate organic derivative having the chemical formula: $(NH_4)_3 \cdot \beta\text{-}\{[C_6H_5C(CH_2O)_3]CrMo_6O_{18}(OH)_3\}$, which was prepared in the process as follows:

Phenylacetaldehyde (10.75 g, 0.09 mol) and paraformaldehyde (16.8 g, 0.56 mol) were dissolved in 60 ml of a tetrahydrofuran solution, into which $Ca(OH)_2$ (5.2 g, 0.70 mol) was added, and the mixed solution was stirred at 60-65° C. for 4 days at room temperature. After the mixed solution was cooled to room temperature, it was filtered with a celite filter aid, and the filtrate was rotary evaporated to give a pale yellow oily residue. The pale yellow oil was dissolved in a small amount of hot ethyl acetate, followed by addition of pyridine and then addition of petroleum ether for extraction. After two extractions, the pyridine phase was concentrated to give a cream white oily product (8.26 g, 50%).

10.71 g (10 mmol) of Cr-Anderson-type heteropolymolybdate, $(NH_4)_3 \cdot \alpha\text{-}[CrMo_6O_{18}(OH)_6]$, and 2.73 g of $C_6H_5C(CH_2OH)_3$ (15 mmol) were mixed in 50 ml water, subjected to a hydrothermal reaction at 120° C. for 24 hours, and naturally evaporated in the air to obtain a pink crystal with a yield of 74%.

Crystallographic data: $C_{10}H_{34}CrMo_6N_3O_{28}$, $M_r=1272.15$, monoclinic, space group $C_2/c$, α=25.4985(8); b=11.8323(3); c=23.5325(5) Å, α=γ=90°, β=112.058(7)°, Z=8, T=173(2)K, $R_1$(final)=0.0463, $wR_2$=0.1172.

IR(KBr pellet, $cm^{-1}$): 3459, 1650, 1400, 1070, 943, 911, 674, 566.

The anion crystal structure is shown in FIG. 3.

Example 4

This example provides a single-side modified β-Anderson-type heteropolymolybdate organic derivative having the chemical formula: $(NH_4)_3 \cdot \beta\text{-}\{[HOOCCH_2NHC(CH_2O)_3]CrMo_6O_{18}(OH)_3\}$, which was prepared in the process as follows:

10.71 g (10 mmol) of Cr-Anderson-type heteropolymolybdate, $(NH_4)_3 \cdot \alpha\text{-}[CrMo_6O_{18}(OH)_6]$, and 1.79 g of $HOOCCH_2NH(CH_2OH)_3$ (20 mmol) were mixed in 50 ml water, subjected to a hydrothermal reaction at 130° C. for 12 hours, and naturally evaporated in the air to obtain a pink crystal with a yield of 88%.

Crystallographic data: $C_6H_{55}CrMo_6N_4O_{40}$, $M_r=1435.26$, monoclinic, space group $P2_1/c$, $\alpha=8.8637(2)$; $b=28.5507(8)$; $c=15.8631(4)$ Å, $\alpha=\gamma=90°$, $\beta=100.099(3)°$, $Z=4$, $T=173(2)$ K, $R_1(final)=0.0273$, $wR_2=0.0539$.

IR (KBr pellet, $cm^{-1}$): 3421, 1732, 1641, 1401, 1383, 1234, 1111, 1059, 939, 918, 904, 804, 663, 575, 445.

The anion crystal structure is shown in FIG. 4.

Example 5

This example provides a single-side modified β-Anderson-type heteropolymolybdate organic derivative having the chemical formula: $[H_3NC(CH_2O)_3]_2 \cdot \beta\text{-}\{[H_3NC(CH_2O)_3]CrMo_6O_{18}(OH)_3\}$, which was prepared in the process as follows:

10.71 g (10 mmol) of Cr-Anderson-type heteropolymolybdate, $(NH_4)_3 \cdot \alpha\text{-}[CrMo_6O_{18}(OH)_6]$, and 1.815 g of $H_2NC(CH_2OH)_3$ (15 mmol) in 10 ml ethanol were mixed in 50 ml water, and subjected to a hydrothermal reaction at 130° C. for 13 hours. 3.14 g (20 mmol) of $H_2NC(CH_2OH)_3$ hydrochloride was added, and the mixture was cooled to room temperature under stirring for 10 min, followed by filtration to remove a small amount of precipitate, and naturally evaporated in the air to obtain a pink crystal with a yield of 90%.

Crystallographic data: $C_{12}H_{48}N_3CrMo_6O_{36}$, $M_r=1438.17$, monoclinic, space group $P2_1/n$, $\alpha=15.0034(3)$, $b=11.6841(4)$, $c=22.8855(6)$ Å, $\alpha=\gamma=90°$, $\beta=98.022(2)°$, $Z=4$, $T=100(2)$ K, $R_1(final)=0.0274$, $wR_2=0.0651$.

IR (KBr pellet, $cm^{-1}$): 3343, 2960, 2874, 1632, 1480, 1384, 1050, 935, 913, 895, 794, 659.

Example 6

This example provides a single-side modified β-Anderson-type heteropolymolybdate organic derivative having the chemical formula: $[TBA]_4 \cdot \beta\text{-}\{[H_2NC(CH_2O)_3]CrMo_6O_{18}(OH)_3\}Br$, which was prepared in the process as follows:

10.71 g (10 mmol) of Cr-Anderson-type heteropolymolybdate, $(NH_4)_3 \cdot \alpha\text{-}[CrMo_6O_{18}(OH)_6]$, and 1.815 g of $H_2NC(CH_2OH)_3$ (15 mmol) in 10 ml ethanol were mixed in 50 ml water, and subjected to a hydrothermal reaction at 130° C. for 15 hours. 9.66 g (30 mmol) of tetrabutylammonium bromide was added and stirred for 10 min to give a large amount of pink precipitate which was cooled to room temperature and filtered to give a filter cake; yield: 93%. 1 g of the precipitate was redissolved in a DMF/MeCN (at a 3:2 ratio) mixed solvent (9 ml of DMF, 6 ml of MeCN), an additional 0.2 g of [TBA]Br was added to accelerate the crystallization process, and then the mixture was naturally evaporated in air to give a pink crystal.

Crystallographic data: $C_{68}H_{160}N_5CrMo_6O_{26}Br$, $M_r=2173.54$, monoclinic, space group $P2_1$, $\alpha=16.8140(3)$, $b=15.8614(6)$, $c=18.7903(8)$ Å, $\alpha=\gamma=90°$, $\beta=92.867(7)°$, $Z=2$, $T=101(2)$ K, $R_1(final)=0.0359$, $wR_2=0.0933$.

IR (KBr pellet, $cm^{-1}$): 3390, 2960, 2937, 2874, 1650, 1479, 1381, 1147, 1070, 937, 918, 901, 800, 663, 575, 442.

The anion crystal structure is shown in FIG. 5.

Example 7

This example provides a single-side modified β-Anderson-type heteropolymolybdate organic derivative having the chemical formula: $[TBA]_3 \cdot \beta\text{-}\{[CH_3C(CH_2O)_3]CrMo_6O_{18}(OH)_3\}$, which was prepared in the process as follows:

10.71 g (10 mmol) of Cr-Anderson-type heteropolymolybdate, $(NH_4)_3 \cdot \alpha\text{-}[CrMo_6O_{18}(OH)_6]$, and 1.2 g of $CH_3C(CH_2OH)_3$ (10 mmol) in 5 ml acetonitrile were mixed in 50 ml water, and subjected to a hydrothermal reaction at 120° C. for 14 hours. 9.66 g (30 mmol) of tetrabutylammonium bromide was added and stirred for 10 min to give a large amount of pink precipitate which was cooled to room temperature and filtered to give a filter cake; yield: 95%. 1 g of the precipitate was redissolved in a DMF/MeCN (at a 4:1 ratio) mixed solvent (12 ml of DMF, 3 ml of MeCN), and then the mixture was naturally evaporated in air to give a pink crystal.

Crystallographic data: $C_{53}H_{142}N_3CrMo_6O_{35}$, $M_r=2009.16$, orthorhombic, space group P212121, $\alpha=15.7562(5)$, $b=22.0956(3)$, $c=25.8114(3)$ Å, $\alpha=\gamma=\beta=90°$, $Z=4$, $T=100(2)$ K, $R_1(final)=0.0461$, $wR_2=0.0891$.

IR (KBr pellet, $cm^{-1}$): 2961, 2874, 1480, 1384, 1050, 935, 914, 895, 794, 659.

The anion crystal structure is shown in FIG. 6.

Example 8

This example provides a single-side modified β-Anderson-type heteropolymolybdate organic derivative having the chemical formula: $(NH_4)[TBA]_4 \cdot \beta\text{-}\{[C_2H_5C(CH_2O)_3]CrMo_6O_{18}(OH)_3\}Br_2$, which was prepared in the process as follows:

10.71 g (10 mmol) of Cr-Anderson-type heteropolymolybdate, $(NH_4)_3 \cdot \alpha\text{-}[CrMo_6O_{18}(OH)_6]$, and 1.34 g of $C_2H_5C(CH_2OH)_3$ (10 mmol) in 5 ml acetonitrile were mixed in 50 ml water, and subjected to a hydrothermal reaction at 125° C. for 13 hours. 9.66 g (30 mmol) of tetrabutylammonium bromide was added and stirred for 10 min to give a large amount of pink precipitate which was cooled to room temperature and filtered to give a filter cake; yield: 93%. 1 g of the precipitate was redissolved in a DMF/MeCN (at a 3:2 ratio) mixed solvent (9 ml of DMF, 6 ml of MeCN), an additional 0.2 g of [TBA]Br and 0.1 g $NH_4Br$ was added to accelerate the crystallization process, and then the mixture was naturally evaporated in air to give a pink crystal.

Crystallographic data: $C_{70}H_{162}N_5CrMo_6O_{24}Br_2$, $M_r=2245.43$, monoclinic, space group $P2_1/n$, $\alpha=16.8794(3)$, $b=26.7375(6)$, $c=22.5208(4)$ Å, $\alpha=\gamma=90°$, $\beta=91.812(2)°$, $Z=2$, $T=103(2)$ K, $R_1(final)=0.0489$, $wR_2=0.1186$.

IR (KBr pellet, $cm^{-1}$): 3459, 3189, 2962, 2874, 1650, 1469, 1384, 1117, 1055, 943, 911, 674, 566.

Example 9

This example provides a single-side modified β-Anderson-type heteropolymolybdate organic derivative having the chemical formula: [TEA] $[TBA]_3 \cdot \beta\text{-}\{[HOCH_2C(CH_2O)_3]CrMo_6O_{18}(OH)_3\}C_1$, which was prepared in the process as follows:

10.71 g (10 mmol) of Cr-Anderson-type heteropolymolybdate, $(NH_4)_3 \cdot \alpha\text{-}[CrMo_6O_{18}(OH)_6]$, 2.72 g of $HOCH_2C(CH_2OH)$ (10 mmol) in 10 ml ethanol were mixed in 50 ml water, and subjected to a hydrothermal reaction at 150° C. for 18 hours. 9.66 g (30 mmol) of tetrabutylammonium bromide was added and stirred for 10 min to give a large amount of pink precipitate which was cooled to room temperature and filtered to give a filter cake; yield: 87%. 1 g of the precipitate was redissolved in a DMF/MeCN (at a 2:3 ratio) mixed solvent (6 ml of DMF, 9 ml of MeCN), an additional 0.2 g of $[TBA]C_1$ was added to accelerate the crystallization process, and then the mixture was naturally evaporated in air to give a pink crystal.

Crystallographic data: $C_{61}H_{144}ClCrMo_6N_4O_{27}$, $M_r$=2024.86, monoclinic, space group $P2_1/n$, $\alpha$=17.288(3); b=24.679(4); c=20.843(5) Å, $\alpha=\gamma=90°$, $\beta=102.868(3)°$, Z=4, T=93K, $R_1$(final)=0.0562, $wR_2$=0.1089.

IR (KBr pellet, cm$^{-1}$): 3381, 2961, 2936, 2875, 1660, 1482, 1381, 1131, 1027, 940, 919, 901, 661, 577, 451.

The anion crystal structure is shown in FIG. 7.

Example 10

This example provides a single-side modified β-Anderson-type heteropolymolybdate organic derivative having the chemical formula: $[TMA]_2\cdot\beta\text{-}\{[H_3NC(CH_2O)_3]CrMo_6O_{18}(OH)_3\}$, which was prepared in the process as follows:

10.71 g (10 mmol) of Cr-Anderson-type heteropolymolybdate $(NH_4)_3\cdot\alpha\text{-}[CrMo_6O_{18}(OH)_6]$, and 1.815 g of $H_2NC(CH_2OH)_3$ (15 mmol) in 10 ml ethanol were mixed in 50 ml water, and subjected to a hydrothermal reaction at 130° C. for 15 hours. 4.62 g (30 mmol) of tetramethylammonium bromide was added and stirred for 10 min to give a large amount of pink precipitate which was cooled to room temperature and filtered to give a filter cake; yield: 93%. 1 g of the precipitate was redissolved in a DMF/MeCN (at a 2:3 ratio) mixed solvent (6 ml of DMF, 9 ml of MeCN), an additional 0.2 g of [TBA]Br was added to accelerate the crystallization process, and then the mixture was naturally evaporated in air to give a pink crystal.

Crystallographic data: $C_{12}H_{42}CrMo_6N_3O_{27}$, $M_r$=1288.11, triclinic, space group $P_i$, $\alpha$=12.787(2); b=15.572(4); c=23.186(6) Å, $\alpha$=76.36(3), $\beta$=87.94(3), $\gamma$=67.63(3)°, Z=2, T=200K, $R_1$(final)=0.0441, $wR_2$=0.1096.

IR (KBr pellet, cm$^{-1}$): 3332, 3029, 2959, 2882, 1644, 1485, 1416, 1384, 1123, 1027, 1001, 935, 897, 645, 482.

Example 11

For comparison, this example provides a single-side modified α-Anderson-type heteropolymolybdate organic derivative having the chemical formula: $(NH_4)_3\cdot\alpha\text{-}\{[HOCH_2C(CH_2O)_3]CrMo_6O_{18}(OH)_3\}$, which was prepared in the process as follows:

10.71 g (10 mmol) of Cr-Anderson-type heteropolymolybdate $(NH_4)_3\cdot\alpha\text{-}[CrMo_6O_{18}(OH)_6]$, and 2.72 g of $HOCH_2C(CH_2OH)_3$ (10 mmol) were mixed in 50 ml water, subjected to a hydrothermal reaction at 100° C. for 3 hours, and then evaporated in open air to produce a large amount of pink precipitate which was cooled to room temperature. The solid was redissolved in 50 mL deionized water and naturally evaporated in the air to obtain a pink crystal with a yield of 91%.

Crystallographic data: $C_5H_{30}N_4CrMo_6O_{28}$, $M_r$=1221.94, monoclinic, space group $P2_1/n$, $\alpha$=16.988(3); b=24.079(5); c=20.143(4) Å, $\alpha=\gamma=90°$, $\beta=102.888(6)°$, Z=4, T=93K, $R_1$(final)=0.0562, $wR_2$=0.1186.

Example 12

For comparison, this example provides a single-side modified α-Anderson-type heteropolymolybdate organic derivative having the chemical formula: $(NH_4)_3\cdot\beta\text{-}\{[C_2H_5C(CH_2O)_3]CrMo_6O_{18}(OH)_3\}$, which was prepared in the process as follows:

10.71 g (10 mmol) of Cr-Anderson-type heteropolymolybdate $(NH_4)_3\cdot\alpha\text{-}[CrMo_6O_{18}(OH)_6]$, and 1.5 g of $C_2H_5C(CH_2OH)_3$ (10 mmol) were mixed in 50 ml water, subjected to a hydrothermal reaction at 100° C. for 8 hours, and naturally evaporated in the air to obtain a pink crystal with a yield of 92%.

Crystallographic data: $C_6H_{34}N_3CrMo_6O_{28}$, $M_r$=1223.96, triclinic, space group $P_i$, $\alpha$=11.1442(5); b=14.1977(9); c=21.2252(10) Å, $\alpha$=76.470(2), $\beta$=87.188(4), $\gamma$=67.629(3)°, Z=2, T=100K, $R_1$(final)=0.0422, $wR_2$=0.0980.

What is claimed is:

1. A single-side modified β-Anderson-type heteropolymolybdate organic derivative comprising an anionic moiety and a cationic moiety, wherein the anionic moiety has a general formula represented by:

$$\beta\text{-}\{[RC(CH_2O)_3]M(OH)_3Mo_6O_{18}\}^{3-},$$

wherein:
β represents a non-planar folded structure;
R=substituted or unsubstituted phenyl, $C_lH_{2n}X$ (n is an integer from 0 to 22; X=H, OH, $NH(CH_2)_3SO_3H$, $NHCH_2COOH$, $NH_2$, or $NO_2$); and
M=$Cr^{3+}$.

2. The single-side modified β-Anderson-type heteropolymolybdate organic derivative according to claim 1, wherein the cation of the cationic moiety comprises one or more of $TBA^+$, $TEA^+$, $TMA^+$, $NH_4^+$, and $H_3NC(CH_2O)_3\pm$.

3. The single-side modified β-Anderson-type heteropolymolybdate organic derivative according to claim 1, wherein the single-side modified β-Anderson-type heteropolymolybdate organic derivative includes:

$(NH_4)_3\cdot\beta\text{-}\{[O_3S(CH_2)_3NH_2C(CH_2O)_3]CrMo_6O_{18}(OH)_3\}$;
$(NH_4)_3\cdot\beta\text{-}\{[C_2H_5C(CH_2O)_3]CrMo_6O_{18}(OH)_3\}$;
$(NH_4)_3\cdot\beta\text{-}\{[C_6H_5C(CH_2O)_3]CrMo_6O_{18}(OH)_3\}$;
$(NH_4)_3\cdot\beta\text{-}\{[HOOCCH_2NHC(CH_2O)_3]CrMo_6O_{18}(OH)_3\}$;
$[H_3NC(CH_2O)_3]_2\cdot\beta\text{-}\{[H_3NC(CH_2O)_3]CrMo_6O_{18}(OH)_3\}$;
$[TBA]_4\cdot\beta\text{-}\{[H_2NC(CH_2O)_3]CrMo_6O_{18}(OH)_3\}Br$;
$[TBA]_3\cdot\beta\text{-}\{[CH_3C(CH_2O)_3]CrMo_6O_{18}(OH)_3\}$;
$(NH_4)[TBA]_4\cdot\beta\text{-}\{[C_2H_5C(CH_2O)_3]CrMo_6O_{18}(OH)_3\}Br_2$;
$[TEA][TBA]_3\cdot\beta\text{-}\{[HOCH_2C(CH_2O)_3]CrMo_6O_{18}(OH)_3\}Cl$; or
$[TMA]_2\cdot\beta\text{-}\{[H_3NC(CH_2O)_3]CrMo_6O_{18}(OH)_3\}$.

* * * * *